United States Patent [19]

Walls et al.

[11] Patent Number: 4,996,016

[45] Date of Patent: Feb. 26, 1991

[54] METHODS FOR MAKING REINFORCED COMPOSITE FLYWHEELS AND SHAFTS

[75] Inventors: W. Alan Walls; Elvin Estes; Steve M. Manifold; Michael L. Spann; John H. Gully, all of Austin, Tex.

[73] Assignee: Board of Regents University of Texas System, Austin, Tex.

[21] Appl. No.: 281,188

[22] Filed: Dec. 7, 1988

[51] Int. Cl.⁵ .................. B29C 43/20; B29C 43/36; B32B 31/06
[52] U.S. Cl. .................. 264/229; 29/450; 264/258; 264/262; 264/328.18
[58] Field of Search .......... 264/229, 258, 262, 328.18; 425/110, 123, 124, 405.1, 812; 249/57, 83, 91; 29/446, 450, 525

[56] References Cited

U.S. PATENT DOCUMENTS

| 3,608,049 | 9/1971 | Tavella | 264/229 |
| 4,153,656 | 5/1979 | Bunyan | 264/262 X |
| 4,434,125 | 2/1984 | Lavender et al. | 264/262 |

FOREIGN PATENT DOCUMENTS

| 292832 | 6/1971 | U.S.S.R. | 264/262 |
| 1080905 | 8/1967 | United Kingdom | 264/229 |

Primary Examiner—Jeffery Thurlow
Assistant Examiner—Leo B. Tentoni
Attorney, Agent, or Firm—Arnold, White & Durkee

[57] ABSTRACT

The maximum safe operating speed of flywheels and shafts made of low tensile strength material is often determined by the speed at which radial tensile stress exceeds a radial tensile stress limit for the material. Circumferentially wound fiber composite material, for example, has a relatively low tensile strength along the radial direction perpendicular to the fibers. To increase the maximum safe operating speed, it is therefore desirable to form a fiber composite flywheel or shaft with radial compressive prestress. Such a prestressed flywheel or shaft is made by placing a cylinder within a fiber composite annulus, injecting a bonding agent under pressure into the interface between the annulus and the cylinder, and maintaining the bonding agent under pressure while the bonding agent solidifies. Preferably, the cylinder and annulus are aligned in a concentric relationship during solidification by a chamber into which the cylinder and annulus are placed. The rim portion of a flywheel, for example, is formed from an outer ring (the annulus) and an inner ring (the cylinder, which is hollow in this case). The chamber is defined by a pair of plates which abut opposite faces of the rings, and by two concentric cylinders which limit the radial movement of the rings as the rings expand or contract, respectively, in response to the pressure of the bonding agent. The bonding agent is preferably a mixture of epoxy resin and chopped fiber or other randomly oriented epoxy reinforcing material.

15 Claims, 3 Drawing Sheets

METHODS FOR MAKING REINFORCED COMPOSITE FLYWHEELS AND SHAFTS

BACKGROUND OF THE INVENTION

The United States Government may have rights in the invention pursuant to funding arrangements with the Department of Defense.

1. Field of the Invention

This invention relates generally to flywheels and shafts, and more particularly to a fiber-reinforced composite flywheel or shaft, and a method for producing compressive prestresses in a fiber-reinforced composite flywheel or shaft. This invention may also be used to prestress other low tensile strength materials, for example ceramics, for use in a flywheel or shaft.

2. Description of the Related Art

In the field of electrical pulsed power generation, generators with increased power and energy storage capability are needed to satisfy a host of new applications. Laboratory electromagnetic accelerator experiments, such as impact fusion studies, require reliable high power sources, while other concepts, such as space launchers, may demand stored energies in the gigajoule range.

As described in Walls & Manifold, "Applications of Lightweight Composite Materials in Pulsed Rotating Electrical Generators" 6th IEEE Pulsed Power Conference, Arlington, Va (Jun. 29-Jul. 1, 1987), flywheels are attached to the rotors of pulsed power generators to increase energy storage capabilities. Flywheels function as reservoirs which store rotational kinetic energy. As energy is withdrawn from a spinning flywheel, its angular speed decreases; as energy is supplied to a spinning flywheel, its angular speed increases. Conventionally used steel flywheels, while improving the performance of generators, are limited due to their weight and relatively low maximum permissible tip speeds.

Composite materials, such as epoxy reinforced graphite fibers, have specific strengths about ten times greater than steel. Thus, energy storage flywheels made of hoop wound composite materials can be spun at higher tip speeds to achieve higher specific energy storage than steel flywheels.

The selection of a composite material for a pulsed power flywheel must take into account the magnetic field in the vicinity of the rotor as it spins. The use of a nonconductive composite flywheel and shaft reduces eddy current losses which could be generated as the magnetic field ramps up and down during excitation and discharge. These losses not only produce a drag torque on the rotor, but can also heat and damage the composite material. "KEVLAR," polyaramid fiber made by the Dupont Corporation, graphite, boron, or glass fiber are best suited for flywheel and shaft construction since they are relatively nonconductive.

When a nonconductive shaft and flywheel is used, it is also desirable to eliminate iron from the rotor of the generator completely and use an air-core magnetic circuit for exciting the rotor. This permits the flux density of the excitation field to be increased above the maximum level for iron core circuits, and when the increased flux density is coupled with the higher rotor speeds afforded by the composite flywheels, the generated voltage is substantially increased.

Composite materials, such as those mentioned above, exhibit phenomenal stiffness and strength in the axial direction of the fiber. These materials, however, are highly anisotropic. The transverse stiffness of a fiber composite can be thirty to forty times lower than the longitudinal stiffness, while the transverse strength can be two orders of magnitude lower than the longitudinal strength. Therefore, composite flywheels are typically constructed with the fibers wound predominantly in the circumferential direction (i.e., hoop wound). This construction results in less radial growth than a steel flywheel at any given speed. However, radial stress usually limits the flywheel's rotational speed due to the weak transverse strength of the composite material, and the severity of the problem usually increases with increasing flywheel thickness. Radial stresses produced by the rotation of the flywheel can cause the fibrous composite material to shred or crack circumferentially along the axis of the fibers.

To increase the maximum possible operating speeds of composite flywheels, they are usually constructed in an initial state of radial compression. As the flywheel's speed increases, the radial stress increases to zero, and then into the tensile region. Greater initial precompression leads to greater possible speeds, since the maximum tip speed is determined by the tip speed at which the radial stress exceeds the limit for the composite material.

Interference fits are commonly used to produce precompression. For example, two concentric annular sections of a flywheel have been assembled using an interference fit to produce radial compression in both sections. The interference fit is typically accomplished with tapered press fits rather than thermal fits, since fiber epoxy composites have coefficients of thermal expansion that are too low to provide a significant interface pressure. Interference fits produce a limited amount of precompression and satisfactory stress distribution. For tapered interference fits to be practical, however, the axial dimension of the annular sections must be relatively short to minimize axial assembly forces. Moreover, when a tapered interference fit is used, the assembly must be properly designed to guard against "growth mismatch" due to angular misalignment in the tapers. If not, the resulting uneven interface pressure could cause separation to occur at some portion of the interface, and such separation could lead to an unbalance which would damage the generator.

Fiber composite shafts present additional problems. A rotating shaft experiences radial, tangential, and bending stress. Therefore, more layers of fiber wound material are generally required to produce a shaft capable of performing well in the stressed condition. As stated previously, radial precompression produces flywheels having higher possible rotational speeds. Likewise, radial precompression produces shafts having higher terminal rotational speeds. Unfortunately, an interference fit which produces radial precompression between two annular sections of a shaft is impractical due to the long axial dimension of the shaft.

SUMMARY OF THE INVENTION

The primary object of the present invention is to provide a method and apparatus for making a fiber composite flywheel or shaft having a selected amount of radial compressive prestress. The method may also be used to prestress homogeneous materials.

Another object of the present invention is to produce a flywheel which is capable of rotating at higher speeds than comparable conventional flywheels.

Yet another object of the present invention is to increase the energy storage and power generation capabilities of pulsed power electrical generators.

A further object of the present invention is to produce a fiber composite flywheel that requires little machining prior to use.

In accordance with the above-mentioned objects, a prestressed composite flywheel or shaft comprising at least an inner cylinder and an outer annulus is made by placing the cylinder within the annulus, injecting a bonding agent under pressure into the interface between the cylinder and the annulus, and maintaining the bonding agent under pressure while the bonding agent solidifies. Preferably the cylinder and the annulus are aligned in a concentric relationship during solidification by a chamber into which the cylinder and annulus are placed.

The rim portion of a large flywheel, for example, is formed from an outer ring (the above mentioned annulus) and an inner ring (the above mentioned cylinder, which is hollow in this case). The chamber in this case is defined by a pair of plates which abut opposite faces of the rings, and by two concentric cylinders which limit the radial movement of the outer and inner rings as the rings expand or contract, respectively, in response to the pressure of the bonding agent. The bonding agent is preferably epoxy resin and a catalyst mixed with chopped fiberglass rovings or other suitable reinforcing material such as silicon carbide whiskers and platlets or glass microspheres. The epoxy is cured by heat applied at a relatively low temperature while the rings are contained under stress within the chamber.

BRIEF DESCRIPTION OF THE DRAWINGS

Other objects and advantages of the invention will become apparent upon reading the following detailed description and upon reference to the drawings in which.

Figure 1:
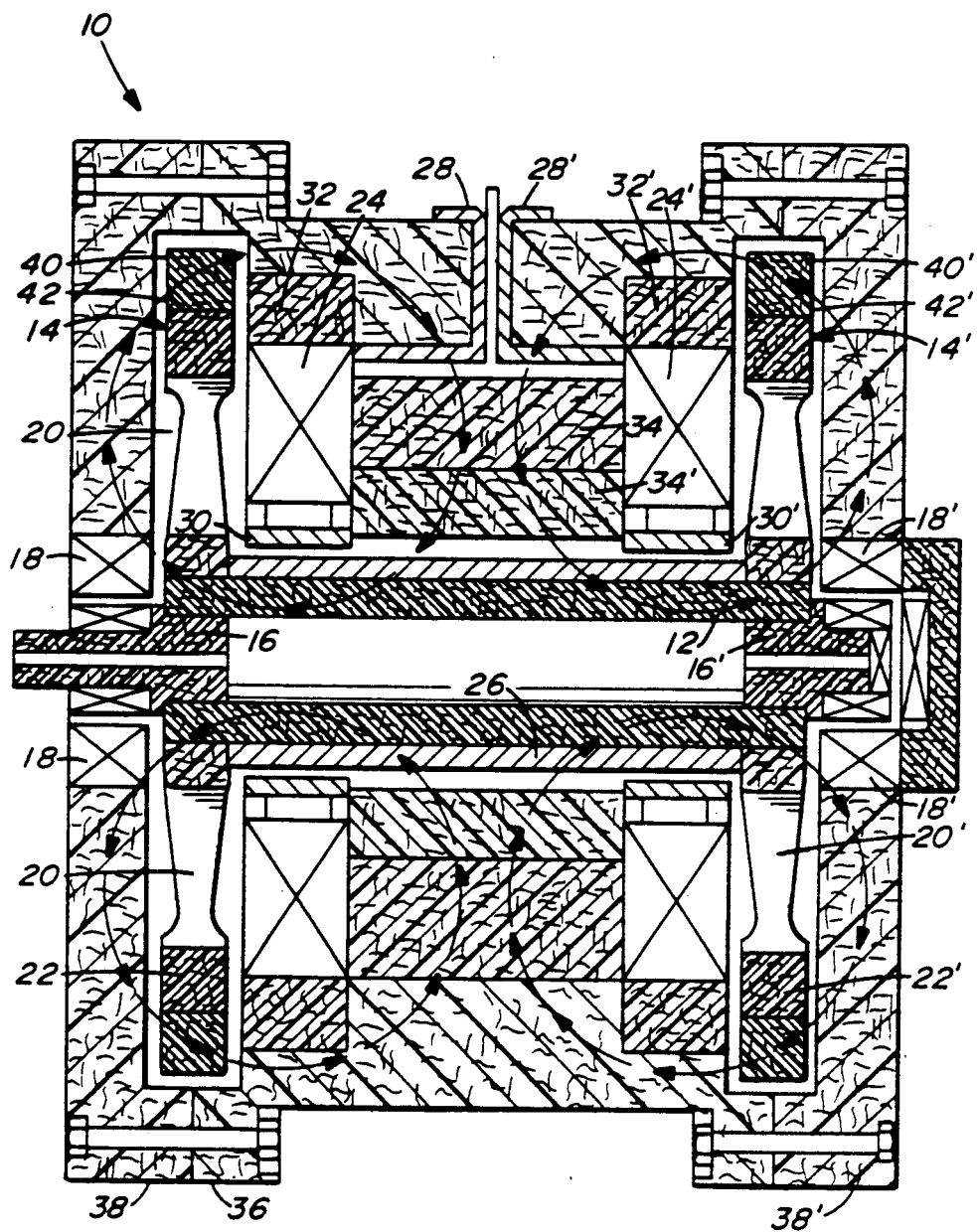
FIG. 1 is a sectional view of a homopolar generator having a fiber composite shaft and flywheel made in accordance with the invention.

While the invention is susceptible to various modifications and alternative forms, specific embodiments thereof have been shown by way of example in the drawings and will be described in detail herein. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

Turning now to FIG. 1 of the drawings, there is shown a homopolar generator 10 including a pair of fiber composite flywheels 14, 14' having been made in accordance with the present invention. The flywheels are interconnected by a fiber composite shaft 12 which is also made in accordance with the invention. The shaft 12 is generally hollow, although it may contain a foam core. The flywheels 14, 14' store rotational kinetic energy received from an external motor (not shown).

Each of the flywheels 14, 14' has an inner hub 16, 16' which spins within journal bearings 18, 18'. As the flywheels spin, the rotation (i.e., the "centrifugal force") produces stress in the radial direction from the hub 16, 16' through a central portion or web structure 20, 20' to the rim 22, 22', and tangential stress along the direction of rotation. The shaft 12 experiences a lesser amount of radial stress, but a greater amount of torsional stress at its ends and bending stress along its axis.

The homopolar generator 10 is designed to have a maximum energy density, in terms of the amount of energy stored per unit weight. The energy density, for example, exceeds 40 kilojoules per kilogram, and the total energy stored is 250 megajoules. This is possible using flywheels having a rim velocity of 1,000 meters per second in a generator which is 1.5 meters long and 1.2 meters in diameter.

The homopolar generator 10 also is designed to deliver a high level of power and a relatively high voltage, for example, 3 megaamperes at 500 volts. The voltage parameter in particular requires a self-excited air-core design in which the load-bearing components of the generator are capable of withstanding a high level of stress applied impulsively for a short duration of less than a second.

To obtain self-excitation of the generator, a pair of annular field coils 24, 24' are electrically connected in series with an armature 26 disposed on the shaft 16. The series circuit also includes output conductors 28, 28' and brushes 30, 30' which are engaged with the armature 26 to complete the circuit and deliver a current pulse to an external load (not shown). Prior to engaging the brushes, an initial field current is supplied externally. This initial field current, however, is only a small fraction of the 3 megaampere field current that is provided by the generator itself.

The magnetic field generated by the field coils (shown by loops of arrows) has a radial component that intersects the mid-axial portion of the armature and thereby generates a voltage between the brushes when the brushes are engaged with the armature. The magnetic field also exerts forces on the field coils themselves as well as the output conductors 28 and the other conductors in the circuit. To withstand these forces, the field coils are contained by overwrap 32, 32' and are held together by axial repulsion tension bars 34, 34'. The field coil assembly itself is held within housing members 36 and 38, 38' that fix the journal bearings 18, 18' in spaced axial relation and provide containment of fragments in the event of flywheel failure.

Due to the high level of mechanical forces and the impulsive magnetic field in the generator, the structural components are preferably made of nonconductive fiber composite materials. Use of a nonconductive composite shaft 12 reduces weight and eddy current losses which would be generated as the magnetic field ramps up and down during excitation and discharge. Graphite-epoxy composites have the highest available specific strength and are preferred for this reason. Graphite-epoxy composites, however, have a slight conductivity and therefore must be used with caution in the shaft due to the possibility of excessive eddy current losses in this high-field region.

Due to the high flywheel rim velocity (1,000 meters per second) and the impulsive nature of the flywheel deceleration, the construction of the flywheel is of critical importance to achieving the maximum energy density and discharge speed for the homopolar generator. To provide increased strength in the tangential direction, the flywheel 14 is composed of circumferentially wound fibers such as "KEVLAR" polyaramid fiber or graphite. Fibers of this type exhibit extraordinary strength and stiffness in the axial direction of the fibers. Therefore, circumferentially wound fibers form a flywheel that is capable of withstanding a tremendous amount of tangential stress. The primary stresses imposed on the fibers are then oriented along their lengths and increase in proportion to the square of the radial distance of the fiber from the axis of rotation. Since the fibers are anisotropic, however, circumferentially wound flywheels have relatively low radial tensile strengths. In practice, it is the radial tensile stress in a fiber composite flywheel that limits the safe rotational operating speed. By establishing an initial radial compressive prestress, the maximum speed at which the flywheel may be operated safely is increased significantly since the radial stress caused by rotation must first relieve the compression before radial tensile stress arises.

Figure 2:
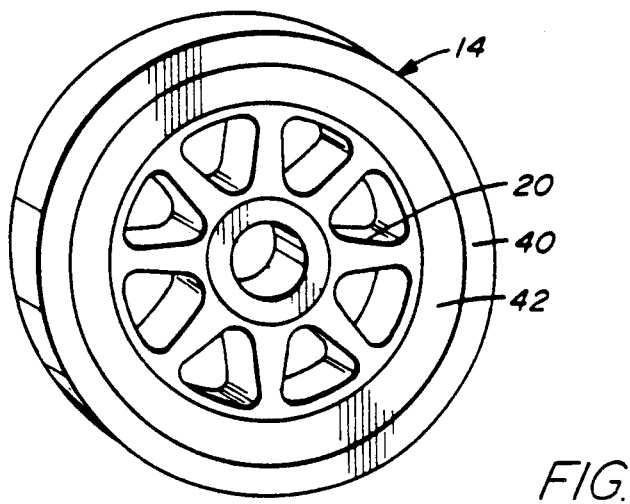
FIG. 2 is an isometric view of the flywheel.

In the flywheel 14, the radial compressive prestress is a maximum at the interface between an outer ring 40 and an inner ring 42. These rings are more clearly shown in the isometric view of FIG. 2. One method of providing the radial compressive prestress is to assemble the outer ring onto the inner ring by a press-fitting operating in which the inner and outer rings are dimensioned for a tapered interference fit. As noted above, however, rings assembled by such an interference fit are subject to possible separation, and such an interference fit is difficult to obtain between radially thin rings or shafts.

In accordance with an important aspect of the present invention, a flywheel or shaft is assembled from radially thin concentric rings of fiber composite material by injecting a bonding agent under pressure into the interface between the rings and maintaining the pressure until the bonding agent solidifies. Therefore it is possible to obtain a radial compressive stress in all of the rings and a tangential compressive stress in all but the outermost ring. Such an arrangement of prestress is preferred for achieving a maximum possible safe operating speed for the flywheel or shaft.

Figure 3:
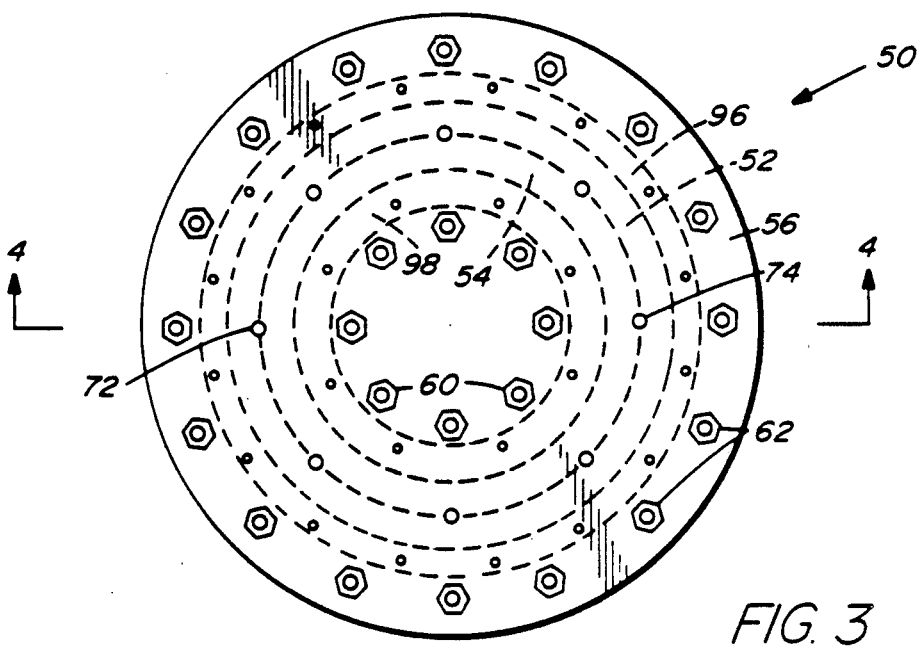
FIG. 3 is a front view of an apparatus for making a precompressed shaft or flywheel.
Figure 4:
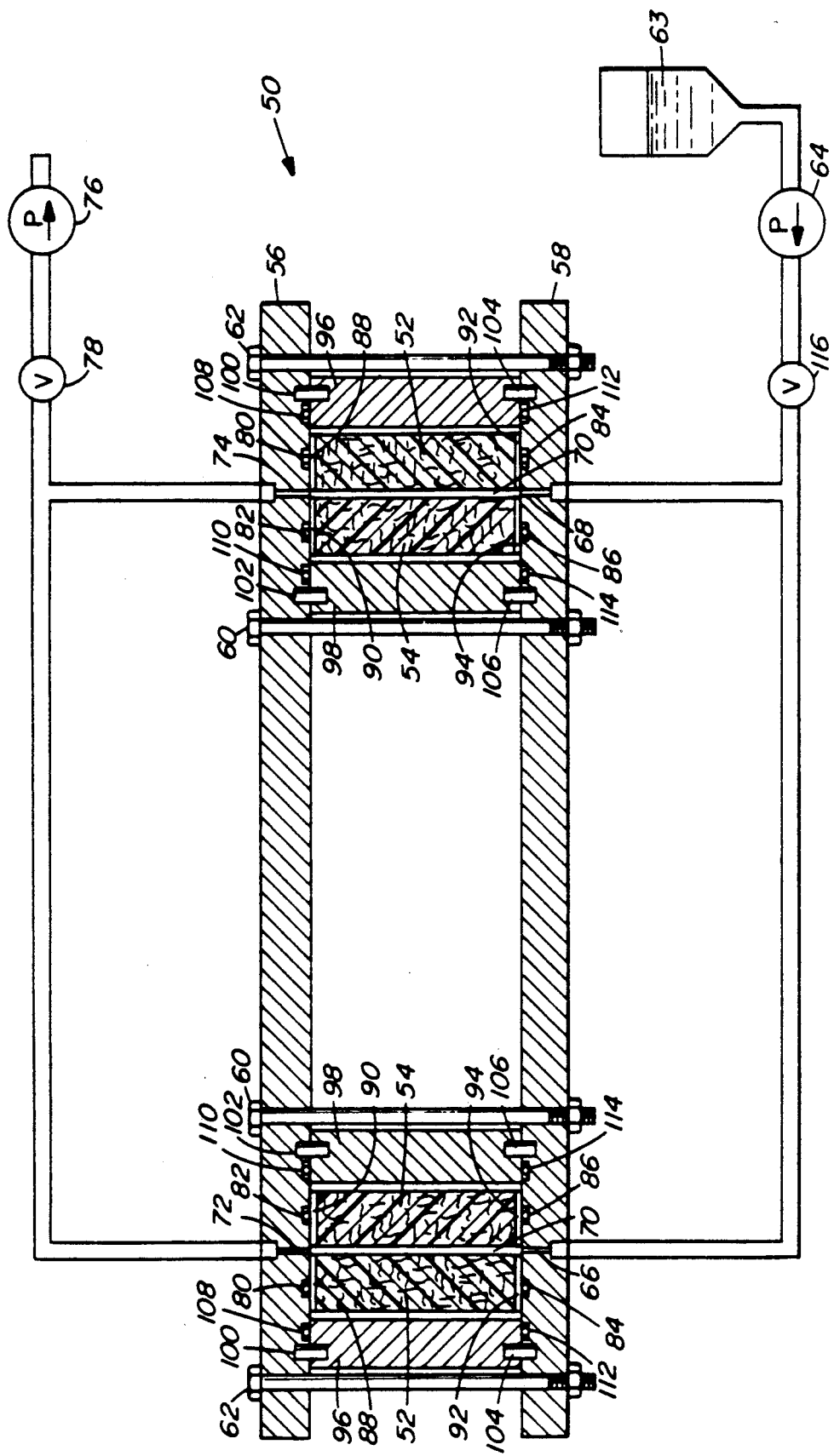
FIG. 4 is a sectional view along line 4—4 in FIG. 3.

Turning now to FIGS. 3 and 4, there is shown an apparatus 50 especially adapted for using the method of the present invention to assemble a pair of concentric rings 52, 54 for the rim of a flywheel while maintaining the concentric or coaxial relationship between the rings. The fiber composite rings 52, 54 are disposed between two plates 56, 58. As shown in FIG. 4, the rings 52, 54 are clamped between the plates 56, 58 by an inner circle of bolts 60 and an outer circle of bolts 62.

A high pressure pump 64 injects a bonding agent 63, preferably an epoxy mixture reinforced with chopped fibers or other fillers, through openings 66, 68 in the lower plate 58 into a thin annular void 70 formed between the rings 52, 54. Air is removed from the annular region 70 via openings 72, 74 in the upper plate 56 to insure that the epoxy mixture fills the annular region 70. Although most of the air is displaced from the region 70 by the inrush of epoxy, a vacuum pump 76 advantageously extracts virtually all of the air via the openings 72, 74. When the air has been removed from the annular region 70, a valve 78 is closed to allow pressure to build between the rings 52, 54 when the epoxy is injected.

As the pressure of the epoxy mixture increases, the rings begin to move radially in response to the pressure. The diameter of the outer ring 52 expands, while the diameter of the inner ring 54 contracts. O-ring seals 80, 82, 84, 86 are disposed in respective grooves in the plates 56, 58 to provide a seal between the edges of each ring 52, 54 and the plates 56, 58. Since the edges of the rings 52, 54 that contact the O-rings and the plates exhibit frictional drag which tends to inhibit the radial movement of the rings, sacrificial rings 88, 90, 92, 94 of low-friction material such as "MYLAR" polyester film or "TEFLON" polytetrafluoroethylene are bonded to these faces of the rings. The sacrificial rings 88, 90, 92, 94 provide a low friction surface for ease of movement of the fiber composite rings 52, 54.

To align the rings 52, 54 in a coaxial or concentric relationship when the epoxy mixture solidifies, two concentric steel cylinders 96, 98 are also supported between the plates 56, 58 such that the fiber composite rings 52, 54 fit in the chamber formed by the cylinders 96, 98 and the plates 56, 58. As the fiber composite rings 52, 54 move radially, the outer ring 52 contacts the outer cylinder 96, and the inner ring 54 contacts the inner cylinder 98. Preferably, the cylinders 96, 98, are held in place by circles of pins 100, 102, 104, 106 between the cylinders 96, 98 and the plates 56, 58. O-ring seals 108, 110, 112, 114 could also be placed between the cylinders 96, 98 and the plates 56, 58 to prevent any leakage of epoxy from contacting the pins.

The cylinders 96, 98 limit the radial movement of each ring 52, 54 to respective predetermined radial positions. By maintaining concentricity of the polyaramid fiber rings 52, 54, the epoxy-filled annulus 70 is of uniform thickness in the radial and axial directions. Therefore a minimum of machining after assembly of the flywheel is required to ensure dynamic balance.

When the pressure of the epoxy mixture reaches a predetermined pressure, a valve 116 is closed to keep the uncured epoxy mixture under pressure. The epoxy is then cured under pressure while the rings 52, 54 remain in the apparatus 50. To minimize thermal growth of the rings 52, 54 during curing, the curing preferably is performed at a relatively low temperature such as 125 degrees Fahrenheit. After the epoxy mixture cures, the bonded rings 52, 54 are extracted from between the plates 56, 58 and the sacrificial rings 88, 90, 92, 94 are removed. The bonded rings 52, 54 are then used as the rim of a flywheel where both rings have a radial compressive prestress, the innermost ring 54 has tangential compressive prestress, and the outermost ring 52 has a tangential tensile stress.

The apparatus 50 may be modified to simultaneously induce compressive stresses on more than two rings. For the case of three concentric fiber composite rings, for example, the apparatus requires openings for epoxy injection and air removal for each of the two annular regions between the pairs of adjacent rings. To further obtain a desired stress distribution, separate respective pumps could be used for injecting the bonding agent at a different selected pressure in each of the annular regions.

By way of example, two circumferentially wound "KEVLAR", polyaramid fiber rings were machined such that the outer ring had an inner diameter of 21.52 inches, an outer diameter of 23.00 inches, and a width of 3.00 inches, and the inner ring had an inner diameter of 20.0 inches, outer diameter of 21.48 inches, and a width of 3.00 inches. The ring faces were coated with a layer of epoxy which was cured against a glass plate to provide a smooth surface. When concentrically supported between a pair of aluminum plates, the rings formed an annular region between them having a width of 0.02 inches.

To permit strain gages to be attached to the outer circumference of the outer ring and the inner circumference of the inner ring, circles of pins fixed to the plates instead of steel cylinders were used as a means for aligning the rings in a concentric relationship. The outer diameter of the inner circle of pins measured 19.96 inches, and the inner diameter of the outer circle of pins measured 23.03 inches. Therefore, the inner diameter of the inner composite ring could decrease by 0.04 inches to 19.96 inches, and the outer diameter of the outer composite ring could increase by 0.03 inches to 23.03 inches, without being limited by the circles of pins.

A grease gun rated at 10,000 psi injected a fiber-reinforced epoxy mixture (Epon Corp. type 828 and V-40 epoxies) through an opening in the lower one of the plates into the annulus between the two fiber composite rings. Silicon rubber O-ring seals between the surface of the plates and the glass-cured epoxy edges of the rings helped prevent epoxy leakage. After the epoxy filled the annulus, an air bleed hole in the upper plate was plugged. The grease gun then injected the epoxy mixture to a final pressure of 1250 psi. The clamping bolts between the plates were tightened to permit the seals to withstand the increased pressured. This pressure was sufficient to move the inner and outer composite rings into engagement with the inner and outer circles of pins, respectively. A 5000 psi check valve maintained the pressure while the pressurized epoxy was cured at about 125 degrees Fahrenheit.

After the epoxy had cured, the bonded rings were removed from the apparatus, and the rings were found to have retained a substantial portion of the stress induced by the injection of the uncured epoxy. The outer ring retained about 86% of its maximum stress during epoxy injection, and the outer ring retained about 60% of its maximum stress during epoxy injection. The retained stress included a radial compressive stress in both rings, a tangential compressive stress in the inner ring, and a tangential tensile stress in the outer ring.

Construction of a composite shaft (such as the shaft 12 in FIG. 1) follows generally the same procedure using a very similar apparatus. Different design considerations, however, reflect the different operating environment experienced by the shaft 12. The shaft 12 experiences radial stress, torsional stress, and bending stress. Therefore, to provide strength in various directions, fiber composite shafts are typically constructed of a plurality of annular layers of fiber oriented at different angles with respect to the axial dimension of the shaft. For instance, one layer contains axially oriented fibers to provide bending stiffness, while the next layer contains fibers oriented at 45° with respect to the shaft's axis to provide torsional strength. A shaft of this type, however, possesses very low circumferential and radial strength.

Figure 5:
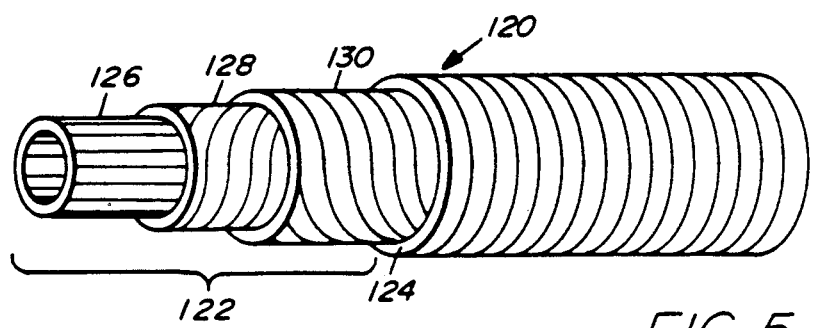
FIG. 5 is a schematic diagram of a composite shaft having a hoop wound outer layer assembled onto an inner layer having axial and skewed fibers in accordance with the present invention.

The internal construction of an improved fiber composite shaft 120 is shown in FIG. 5. To impart circumferential and radial strength to the shaft, a cylindrical or tubular inner layer 122 composed of fibers oriented axially and at 45° to the shaft's axis is bonded to a tubular outer layer 124 of circumferentially wound fibers using the pressurized epoxy cure method. For the sake of illustration the inner layer 122 is shown having inner axial fibers 126 and layers 128, 130 having fibers at alternate 45° angles, but it should be appreciated that the inner layer 122 can have a multiplicity of alternate internal layers and be fabricated by conventional techniques such as pultrusion.

In accordance with an important aspect of the invention, the layers 122, 124 are bonded together by injecting a bonding agent between the layers 122 and 124 to produce a radial precompression in both layers. In this case the outer layer is initially formed as a tube or elongated annulus, and the inner layer 122 (including sublayers 126, 128, and 130, and possibly other similar sublayers) is formed as a tube or elongated hollow cylinder. To receive these tubes having the axial length of the desired shaft, the apparatus of FIG. 3 need only be provided with cylinders (similar to cylinders 96, 98 in FIG. 4) having a correspondingly longer length.

In view of the above, the apparatus of FIG. 4 is capable of making a fiber composite flywheel or shaft having a selected amount of radial compressive prestress. Therefore, the flywheel or shaft has an increased safe operating speed because the radial compressive prestress must be overcome before a radial tensile stress arises that could exceed the critical radial stress limit for the composite material.

The increased operating speed increases the energy storage and power generation capabilities of pulsed power electrical generators. The apparatus of FIG. 4 also ensures that the flywheel or shaft is comprised of concentric layers which improves dynamic balance and consequently little machining of the flywheel or shaft is required to ensure dynamic balance prior to use.

We claim:

1. A method of forming an assembly of an annulus and a cylinder disposed in said annulus in which the annulus and cylinder are radially prestressed, said method comprising the steps of placing the cylinder within said annulus to define an interface between the annulus and the cylinder, injecting a bonding agent under pressure into the interface between the annulus and the cylinder, said bonding agent thereafter solidifying, and maintaining the bonding agent under pressure while the bonding agent solidifies.

2. The method as claimed in claim 1, wherein said cylinder and said annulus each have an axis and opposite end faces normal to said axis, said method further comprises the step of clamping the annulus and the cylinder placed within it between a pair of plates aligned normal to said axes, and said step of clamping is performed before said step of injecting.

3. The method as claimed in claim 2, further comprising the step of aligning said cylinder and said annulus to obtain a coaxial relationship during the solidification of said bonding agent.

4. The method as claimed in claim 3, wherein said annulus has an outer periphery, and said cylinder and said annulus are aligned by means fixed to at least one of said plates which engages said cylinder and the outer periphery of said annulus.

5. The method as claimed in claim 4, wherein said means does not engage the outer periphery of said annulus until said bonding agent has been injected under pressure.

6. The method as claimed in claim 1, wherein the solidifying bonding agent is cured under pressure by the application of heat.

7. The method as claimed in claim 1, wherein said bonding agent is an epoxy mixture including chopped fibers.

8. The method as claimed in claim 1, wherein said annulus includes wound fibers.

9. The method as claimed in claim 1, wherein said cylinder is hollow and is comprised of fiber composite material.

10. The method as claimed in claim 1, further comprising the step of making a flywheel from said assembly, wherein said flywheel has a rim including said annulus.

11. A method of forming a fiber composite flywheel or shaft, comprising the steps of:
   mounting between two plates two concentric fiber composite rings which form an annulus region bounded by said rings; and
   injecting under pressure a bonding agent into said annulus region, said bonding agent solidifying under pressure, to thereby prestress the fiber composite rings.

12. A method of forming a fiber composite flywheel, comprising the steps of:
   attaching a respective sacrificial ring to opposite end faces of each of two fiber composite rings;
   supporting said two fiber composite rings with attached sacrificial rings concentrically between two plates abutting said opposite end faces of said rings, said rings forming an annular region therebetween;
   injecting under pressure a bonding agent into the annular region, said bonding agent solidifying under pressure, to thereby prestress said concentric fiber composite rings.

13. The method as set forth in claim 12, wherein said sacrificial rings have a relatively low friction surface as compared with the faces of the fiber composite rings to allow the fiber composite rings to slide on the surface of said plates in response to the injection pressure of the bonding agent while said plates are forced upon said rings to contain said injection pressure.

14. A method of forming a fiber composite flywheel or shaft, comprising the steps of:
   placing said two fiber composite rings each having opposite faces concentrically between two concentric cylinders each having opposite end faces, said concentric rings forming an annular region therebetween;
   supporting said rings and cylinders between two plates adapted to cover the faces of each of the rings; and
   injecting under pressure a bonding agent into said annular region, said concentric cylinders limiting radial expansion and contraction of said rings under said pressure, and said bonding agent solidifying under said pressure to thereby pre-stress said fiber composite rings.

15. The method as claimed in claim 14 wherein said cylinders are fixed to at least one of said plates to fix said cylinders in concentric relation with each other, whereby said rings are bonded in concentric relation with each other.

* * * * *